US012424729B2

(12) United States Patent
Yoon et al.

(10) Patent No.: US 12,424,729 B2
(45) Date of Patent: Sep. 23, 2025

(54) ELECTRONIC DEVICE

(71) Applicant: Samsung Electronics Co., Ltd., Suwon-si (KR)

(72) Inventors: Min Young Yoon, Osan-si (KR); Young Ki Lee, Suwon-si (KR); Kyeol Kwon, Hwaseong-si (KR); Dong Kwon Choi, Suwon-si (KR); Doo Seok Choi, Suwon-si (KR); Joon Hoi Hur, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 275 days.

(21) Appl. No.: 18/152,422

(22) Filed: Jan. 10, 2023

(65) Prior Publication Data

US 2023/0231295 A1 Jul. 20, 2023

(30) Foreign Application Priority Data

Jan. 19, 2022 (KR) ........................ 10-2022-0007888
Apr. 19, 2022 (KR) ........................ 10-2022-0048261

(51) Int. Cl.
*H01Q 1/22* (2006.01)
*H01Q 21/00* (2006.01)

(52) U.S. Cl.
CPC ....... *H01Q 1/2283* (2013.01); *H01Q 21/0025* (2013.01)

(58) Field of Classification Search
USPC ...................................................... 343/700 R
See application file for complete search history.

(56) References Cited

U.S. PATENT DOCUMENTS 6,154,176 A * 11/2000 Fathy ................... H01Q 9/0414 343/846
10,665,959 B2 5/2020 Paulotto et al.
2018/0219272 A1* 8/2018 Baheti .................. H01Q 9/0407
2019/0103653 A1* 4/2019 Jeong .................... H01L 23/645
(Continued)

FOREIGN PATENT DOCUMENTS

KR 102042843 B1 11/2019
KR 10-2020-0024815 A 3/2020
(Continued)

*Primary Examiner* — Dimary S Lopez Cruz
*Assistant Examiner* — Brandon Sean Woods
(74) *Attorney, Agent, or Firm* — Harness, Dickey & Pierce, P.L.C.

(57) ABSTRACT

An electronic device is provided. An electronic device includes a radio frequency integrated circuit (RFIC) chip, and an antenna array electrically connected to the RFIC chip, the antenna array including a first face and a second face facing each other in a first direction, and a third face and a fourth face connecting the first and second faces to each other and facing each other in a second direction intersecting the first direction, the antenna array including a plurality of substrates sequentially stacked in a third direction intersecting a plane defined by the first and second directions, first and second antenna modules on the plurality of substrates and sequentially arranged along the first direction, a first metal partition-wall including at least one metal via extending through the plurality of substrates in the third direction, and a second metal partition-wall surrounding the first to fourth faces.

20 Claims, 22 Drawing Sheets

(56) References Cited

U.S. PATENT DOCUMENTS

| | | | |
|---|---|---|---|
| 2019/0123443 A1 | 4/2019 | Russell et al. | |
| 2019/0348749 A1* | 11/2019 | Thai | H01Q 1/243 |
| 2020/0295454 A1 | 9/2020 | Yun et al. | |
| 2021/0050651 A1 | 2/2021 | Jung et al. | |

FOREIGN PATENT DOCUMENTS

| | | |
|---|---|---|
| KR | 10-2021-0105733 A | 8/2021 |
| KR | 10-2021-0125346 A | 10/2021 |

* cited by examiner

ELECTRONIC DEVICE

CROSS-REFERENCE TO RELATED APPLICATIONS

This application claims priority from Korean Patent Application No. 10-2022-0007888 filed on Jan. 19, 2022, and Korean Patent Application No. 10-2022-0048261 filed on Apr. 19, 2022 in the Korean Intellectual Property Office, and all the benefits accruing therefrom under 35 U.S.C. 119, the contents of which in their entirety are herein incorporated by reference.

BACKGROUND

Technical Field

The present disclosure relates to an electronic device including an antenna array.

Description of Related Art

A high frequency band may be used to increase a throughput of wireless communication. For example, 5G (5th Generation) wireless communication systems require use of a millimeter wave (mmWave) frequency band. Accordingly, it may be required that an antenna for wireless communication provide a wide frequency bandwidth. Further, an antenna array including a plurality of antennas may be used for beamforming. In these cases, it may be essential that the antenna array provides good beam coverage.

However, in a portable wireless communication device, such as a mobile phone, tablet computer, and/or the like, a space for receiving the antenna may be limited. Thus, antennas that provide good performance, despite the limited space and other parts adjacent to the antenna, are being explored.

SUMMARY

A technical purpose of the present disclosure is to provide an antenna that may prevent characteristic deterioration thereof while minimizing influence of other adjacent components thereto thereon.

Another technical of the present disclosure is to provide an antenna having a wide communication radius within a limited space.

Purposes according to the present disclosure are not limited to the above-mentioned purpose. Other purposes and advantages according to the present disclosure that are not mentioned may be understood based on following descriptions, and may be more clearly understood based on embodiments according to the present disclosure. Further, it will be easily understood that the purposes and advantages according to the present disclosure may be realized using means shown in the claims and combinations thereof.

According to an embodiment of the present disclosure, there is provided an electronic device comprising a radio frequency integrated circuit (RFIC) chip, and an antenna array electrically connected to the RFIC chip, the antenna array including a first face and a second face facing each other in a first direction, and a third face and a fourth face connecting the first and second faces to each other and facing each other in a second direction intersecting the first direction, the antenna array including a plurality of substrates sequentially stacked in a third direction intersecting a plane defined by the first and second directions, first and second antenna modules on the plurality of substrates and sequentially arranged along the first direction, a first metal partition-wall including at least one metal via extending through the plurality of substrates in the third direction, and a second metal partition-wall surrounding the first to fourth faces.

According to the aforementioned and other embodiments of the present disclosure, there is provided an electronic device comprising a radio frequency integrated circuit (RFIC) chip, and an antenna array electrically connected to the RFIC chip, wherein the antenna array has first and second faces facing each other in a first direction, and a plurality of side faces connecting the first and second faces to each other, the antenna array including a ground plane on the first face, a plurality of dielectric substrates sequentially stacked on the ground plane in a third direction, a plurality of antenna modules on the plurality of dielectric substrates and spaced apart from each other in the first direction, a first metal partition-wall covering the plurality of side faces, and at least one second metal partition-wall including a ground via connected to the ground plane.

According to the aforementioned and other embodiments of the present disclosure, there is provided an electronic device comprising a radio frequency integrated circuit (RFIC) chip, and an antenna array electrically connected to the RFIC chip, the antenna array including a first face and a second face facing each other in a first direction, and a third face and a fourth face connecting the first and second faces to each other and facing each other in a second direction intersecting the first direction, the antenna array including a plurality of substrates sequentially stacked in a third direction intersecting a plane defined by the first and second directions, first and second antenna modules on the plurality of substrates and sequentially arranged along the first direction, a first metal partition-wall extending in the second direction and including at least first metal via extending through the plurality of substrates in the third direction so as to be exposed to a ground plane, a second metal partition-wall extending in the first direction and including a second metal via extending through the plurality of substrates in the third direction so as to be exposed to the ground plane, and a third metal partition-wall surrounding the first to fourth faces.

BRIEF DESCRIPTION OF DRAWINGS

The above and other aspects and features of the present disclosure will become more apparent by describing in detail some example embodiments thereof with reference to the attached drawings, in which.

DETAILED DESCRIPTIONS

Figure 1:
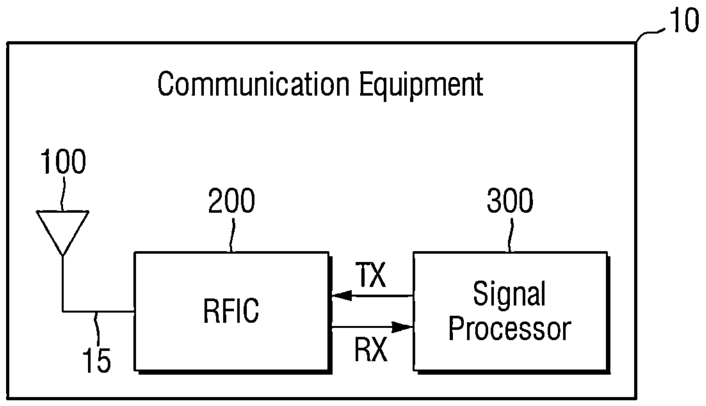
FIG. 1 is a diagram for illustrating a communication device according to some embodiments.

For simplicity and clarity of illustration, elements in the drawings are not necessarily drawn to scale. The same reference numbers in different drawings represent the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure. Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

A shape, a size, a ratio, an angle, a number, etc., disclosed in the drawings for illustrating embodiments of the present disclosure are exemplary, and the present disclosure is not limited thereto. The same reference numerals refer to the same elements herein. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

The terminology used herein is for the purpose of describing particular embodiments only and is not intended to limit the present disclosure. As used herein, the singular forms "a" and "an" are intended to include the plural forms as well, unless the context clearly indicates otherwise. It will be further understood that the terms "comprise", "comprising", "include", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entirety of list of elements and may not modify the individual elements of the list. When referring to "C to D", this means C inclusive to D inclusive unless otherwise specified.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer, or section. Thus, a first element, component, region, layer, or section described below could be termed a second element, component, region, layer, or section, without departing from the spirit and scope of the present disclosure.

In addition, it will also be understood that when a first element or layer is referred to as being present "on" or "beneath" a second element or layer, the first element may be disposed directly on or beneath the second element or may be disposed indirectly on or beneath the second element with a third element or layer being disposed between the first and second elements or layers. It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

Further, as used herein, when a layer, film, region, plate, or the like may be disposed "on" or "on a top" of another layer, film, region, plate, or the like, the former may directly contact the latter or still another layer, film, region, plate, or the like may be disposed between the former and the latter. As used herein, when a layer, film, region, plate, or the like is directly disposed "on" or "on a top" of another layer, film, region, plate, or the like, the former directly contacts the latter and still another layer, film, region, plate, or the like is not disposed between the former and the latter. Further, as used herein, when a layer, film, region, plate, or the like may be disposed "below" or "under" another layer, film, region, plate, or the like, the former may directly contact the latter or still another layer, film, region, plate, or the like may be disposed between the former and the latter. As used herein, when a layer, film, region, plate, or the like is directly disposed "below" or "under" another layer, film, region, plate, or the like, the former directly contacts the latter and still another layer, film, region, plate, or the like is not disposed between the former and the latter.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any of the elements and/or functional blocks disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

In one example, when a certain embodiment may be implemented differently, a function or operation specified in a specific block may occur in a sequence different from that specified in a flowchart. For example, two consecutive blocks may be actually executed at the same time. Depending on a related function or operation, the blocks may be executed in a reverse sequence.

In descriptions of temporal relationships, for example, temporal precedent relationships between two events such as “after”, “subsequent to”, “before”, etc., another event may occur therebetween unless “directly after”, “directly subsequent” or “directly before” is not indicated.

The features of the various embodiments of the present disclosure may be partially or entirely combined with each other, and may be technically associated with each other or operate with each other. The embodiments may be implemented independently of each other and may be implemented together in an association relationship.

Spatially relative terms, such as “beneath,” “below,” “lower,” “under,” “above,” “upper,” and the like, may be used herein for ease of explanation to describe one element or feature’s relationship to another element or feature as illustrated in the figures. It will be understood that the spatially relative terms are intended to encompass different orientations of the device in use or in operation, in addition to the orientation depicted in the figures. For example, when the device in the drawings may be turned over, elements described as “below” or “beneath” or “under” other elements or features would then be oriented “above” the other elements or features. Thus, the example terms “below” and “under” may encompass both an orientation of above and below. The device may be otherwise oriented, for example, rotated 90 degrees or at other orientations, and the spatially relative descriptors used herein should be interpreted accordingly.

Hereinafter, with reference to the accompanying drawings, embodiments according to the technical idea of the present disclosure will be described.

FIG. 1 is a diagram for illustrating a communication device according to some embodiments.

As shown in FIG. 1, a communication device 10 may include an antenna 100, and may transmit and/or receive a signal through the antenna 100, and thus may communicate with another communication device (not illustrated) in a wireless communication system and may be referred to as a wireless communication device.

The wireless communication system may include, for example, a wireless communication system using a cellular network, such as a 5G (5th generation) wireless system, an LTE (Long Term Evolution) system, an LTE-Advanced system, a CDMA (Code Division Multiple Access) system, a GSM (Global System for Mobile Communications), a WLAN (Wireless Local Area Network) system, and/or the like. Hereinafter, one example in which the wireless communication system is embodied as the wireless communication system using the cellular network is mainly described. However, the technical idea of the present disclosure is not limited thereto.

As shown in FIG. 1, the communication device 10 may include the antenna 100, RFIC (Radio Frequency Integrated Circuit) 200, and a signal processor 300. The antenna 100 and the RFIC 200 may be connected to each other via a feed line 15. In some embodiments, the antenna 100 and/or a combination of the antenna 100 and the feed line 15 may be referred to as an antenna module. Further, a combination of the antenna 100, the feed line 15, and the RFIC 200 may be referred to as an RF system and/or an RF device.

The RFIC 200 may provide a signal generated by processing a transmit signal TX provided from the signal processor 300 to the antenna 100 via the feed line 15 in a transmission mode, and/or the RFIC 200 may provide a receive signal RX generated by processing a signal received from the antenna 100 to the signal processor 300 via the feed line 15 in a receive mode. In some examples, the RFIC 200 may include a transmitter, and the transmitter may include a filter, a mixer, and a power amplifier (PA). Further, RFIC 200 may include a receiver, and the receiver may include a filter, mixer, and a low noise amplifier (LNA). In some embodiments, RFIC 200 may include a plurality of transmitters and receivers, and/or may include a transceiver in which the transmitter and the receiver are combined with each other.

The signal processor 300 may process a signal including information to be transmitted to generate the transmit signal TX, and/or may process the receive signal RX to generate a signal including information. For example, the signal processor 300 may include an encoder, a modulator, and a digital-to-analog converter DAC for generating the transmit signal TX. Further, the signal processor 300 may include an analog-to-digital converter ADC, a demodulator, and a decoder for processing the receive signal RX. The signal processor 300 may generate a control signal for controlling the RFIC 200, set the transmission mode or the reception mode based on the control signal, or adjust power and gain of each of components included in the RFIC 200. In some embodiments, the signal processor 300 may include one or more cores and memory for storing instructions executed by the cores, and at least a portion of the signal processor 300 may include a software block stored in the memory. In some embodiments, the signal processor 300 may include a logic circuit designed via logic synthesis, and at least a portion of the signal processor 300 may include a hardware block implemented as a logic circuit.

The wireless communication system may define a high spectrum band for high data throughput. For example, a 5G cellular system (or a 5G wireless system) may specify a millimeter wave (mmWave) higher than or equal to 24 GHz. The millimeter wave (mmWave) enables wideband transmission, and enables miniaturization of an RF system, e.g., the antenna 100 and RFIC 200, and provides improved directivity. However, attenuation is prone to occur. It may be beneficial and/or important to reduce this attenuation.

In order to mitigate signal attenuation due to the high frequency band, high transmit power may be required. According to a Friis transmission formula, the transmit power may be calculated as a product of an output power of a power amplifier and a gain of the antenna 100. However, due to low power efficiency of the power amplifier included in RFIC 200, increasing the power by the power amplifier may cause heat generation and power consumption. For this reason, it may be beneficial and/or important to obtain a high antenna gain in order to increase the transmit power. The antenna gain may be proportional to a size of an effective aperture area. However, in applications that require space efficiency, such as a mobile phone, the effective aperture area may also be limited. Further, the higher the antenna gain, the narrower a beam width output from the antenna 100, thereby causing a problem in that a communication range is reduced.

According to some embodiments, the antenna 100 may receive a differential signal from the RFIC 200 via two or more feed lines. Accordingly, as will be described later with reference to FIG. 3, two signals having opposite phases respectively may be respectively supplied to feed points of the antenna 100 spaced apart from each other, such that high transmit power may be achieved without reducing the performance of the antenna 100.

Figure 2:
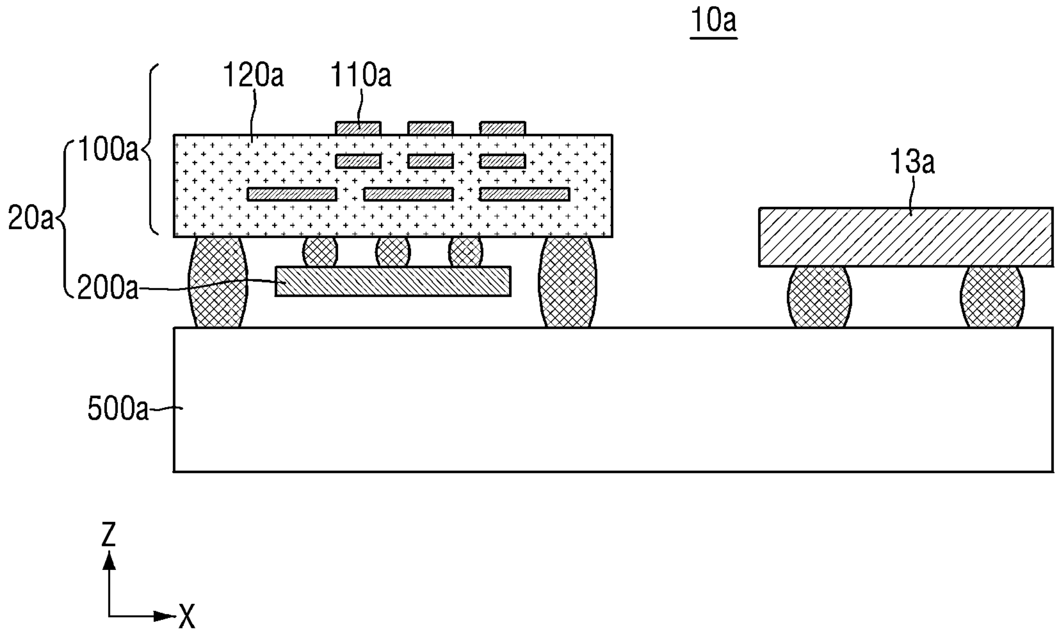
FIG. 2 shows examples of a layout of the components of the communication device of FIG. 1 according to some embodiments.

FIG. 2 shows examples of a layout of the components of the communication device 10 of FIG. 1 according to some embodiments. Hereinafter, FIG. 2 will be described with reference to FIG. 1 and those duplicate descriptions with FIG. 1 may be omitted. In some embodiments, an X-axis direction and a Y-axis direction, mutually orthogonal to each other, may be referred to as a first horizontal direction and a second horizontal direction, respectively, and a plane composed of the X-axis and the Y-axis may be referred to as a horizontal plane. Further, an area may refer to an area in a plane parallel to the horizontal plane, and a direction perpendicular to the horizontal plane (e.g., a Z-axis direction) may be referred to as a vertical direction. A component disposed closer to a side in a +Z-axis direction relative to other components may be referred to as being disposed above other components, while a component disposed closer to a side in a −Z-axis direction relative to other components may be referred to as being disposed below other components. Further, among faces of a component, a surface facing in the +Z axis direction may be referred to as a top face of the component, and a surface facing in the −Z axis direction may be referred to as a bottom face of the component. As noted above, it will be understood that these spatially relative terms are intended to encompass different orientations of the device in use or operation in addition to the orientation depicted in the figures. For example, the device may be otherwise oriented (rotated 90 degrees or at other orientations) and the spatially relative descriptors used herein interpreted accordingly.

In a high frequency band such as a millimeter wave (mmWave) frequency band, most of loss parameters may deteriorate. Thus, it may not be easy to adopt a layout of the antenna 100 and the RFIC 200 used in a low frequency band, for example, a band lower than 6 GHz. For example, an antenna feed structure used in the low frequency band may significantly reduce the attenuation characteristics of the signal in the millimeter wave (mmWave) frequency band, and may generally deteriorate the EIRP (Effective Isotropic Radiated Power) and noise figure. Accordingly, in order to minimize the signal attenuation due to the feed line 15 in FIG. 1, the antenna 100 and RFIC 200 may be disposed adjacently to each other. In particular, high space efficiency may be required in a mobile application such as a mobile phone. Accordingly, as illustrated in FIG. 2, a System-in-Package (SiP) structure in which the antenna 100 is disposed on the RFIC 200 may be employed.

Referring to FIG. 2, a communication device **10*a* may include an RF system 20*a*, a digital integrated circuit 13*a* and a carrier board carrier board 500*a*. The RF system 20*a* and the digital integrated circuit 13*a* may be mounted on a top face of the carrier board 500*a*. The RF system 20*a* and the digital integrated circuit 13*a* may be communicatively connected to each other via conductive patterns formed on the carrier board 500*a*. According to some embodiments, the carrier board 500*a* may be embodied as a PCB (Printed Circuit Board). The digital integrated circuit 13*a* may include the signal processor 300 of FIG. 1, and accordingly, may transmit the transmit signal TX to RFIC 200*a* and/or may receive the receive signal RX from RFIC 200*a*, and transmit the control signal for controlling the RFIC 200*a*. According to some embodiments, the digital integrated circuit 13*a* may include one or more cores and/or memories, and may control an operation of the communication device 10*a***.

The RF system **20*a* may include an antenna module 100*a* and an RFIC chip 200*a*. The antenna module 100*a* may include a dielectric substrate 120*a* and a conductor 110*a* formed on the dielectric substrate 120*a* as shown in FIG. 2. For example, the antenna module 100*a* may include a ground plane and a conductive patch parallel to the horizontal plane, and may include a feed line for supplying a signal from the RFIC chip 200*a* to the conductive patch. The RFIC chip 200*a* may have a top face electrically connected to a bottom face of the antenna module 100*a*. In one example, although not specifically shown, the RFIC chip 200*a* and the digital integrated circuit 13*a* may be mounted on a bottom face of the carrier board 500*b*. The ground plane and the conductive patch may correspond to the antenna 100 of FIG. 1; the feed line may correspond to the feed line 15 of FIG. 1; and/or the RFIC chip 200*a* may correspond to the RFIC chip 200 of FIG. 1**.

Figure 3:
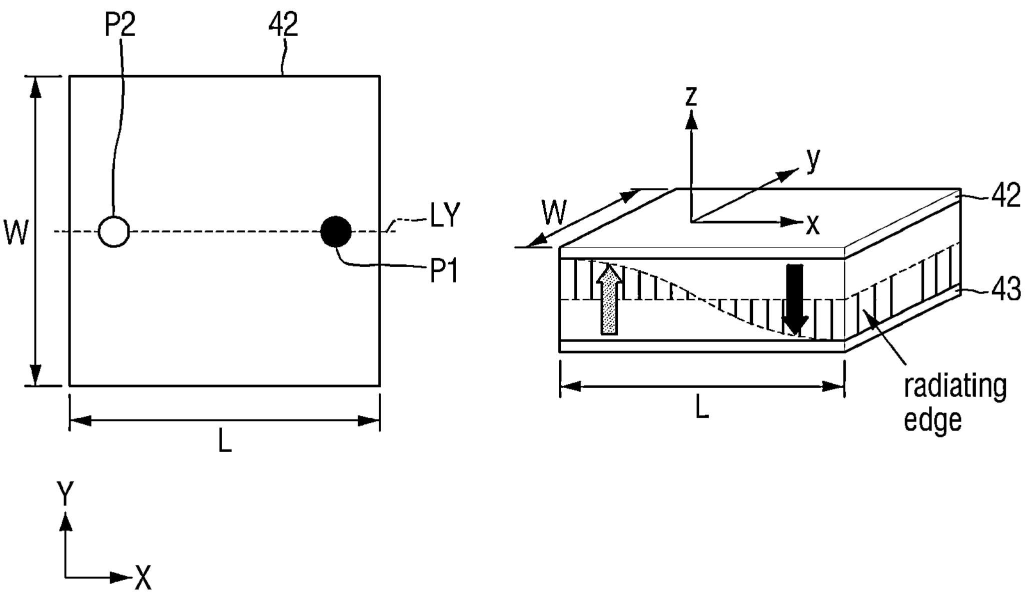
FIG. 3 is a diagram for illustrating an electric field generated by an antenna module according to some embodiments.

FIG. 3 is a diagram for illustrating an electric field generated by an antenna module according to some embodiments. Hereinafter, FIG. 3 will be described with reference to FIGS. 1 and 2 and those duplicate descriptions with FIGS. 1 and 2 may be omitted.

FIG. 3 is a view showing the conductive patch 42 included in the antenna module and an electric field generated by the conductive patch 42 according to some embodiments. Specifically, a drawing on the left of FIG. 3 shows feed points P1 and P2 respectively connected to two feed lines and on a bottom face of the conductive patch 42, while the drawing on the right of FIG. 3 shows the electric field generated between the conductive patch 42 and a ground plane 43.

Referring to FIG. 3, the conductive patch 42 may have a rectangular shape, and may have a length L in the X-axis direction and a width W in the Y-axis direction. According to some embodiments, the length L in the X-axis direction of the conductive patch 42 may be half of a wavelength of a radiating wave from a differential signal. Two feed lines may be connected to the bottom face of the patch 42 at the first feed point P1 and at the second feed point P2, respectively. The first feed point P1 and the second feed point P2 may be spaced apart from each other in the X-axis direction, and the positions of the first feed point P1 and the second feed point P2 on the bottom face of the conductive patch 42 may be determined based on impedance matching. According to some embodiments, the first feed point P1 and the second feed point P2 may be disposed proximately to a first centerline LY parallel to the X-axis and extending through a center of the conductive patch 42.

In the electric field distribution of the antenna module including the conductive patch 42, electric fields out of phase may be respectively generated at both opposing ends around a feed axis. Accordingly, when two input signals respectively having opposite phases (e.g., the differential signal are applied to the feed axis) higher power transmission may be achieved without reducing the performance of the antenna module. For example, when, due to the differential signal, a relatively high potential signal is applied to the first feed point P1 while a relatively low potential signal is applied to the second feed point P2, electric fields out of phase may be respectively generated at both opposing ends around an axis extending through the first feed point P1 and the second feed point P2 (e.g., an axis parallel to the X axis). Accordingly, when compared to a single feed structure, an antenna gain may be maintained, while EIRP may be doubled.

Figure 4:
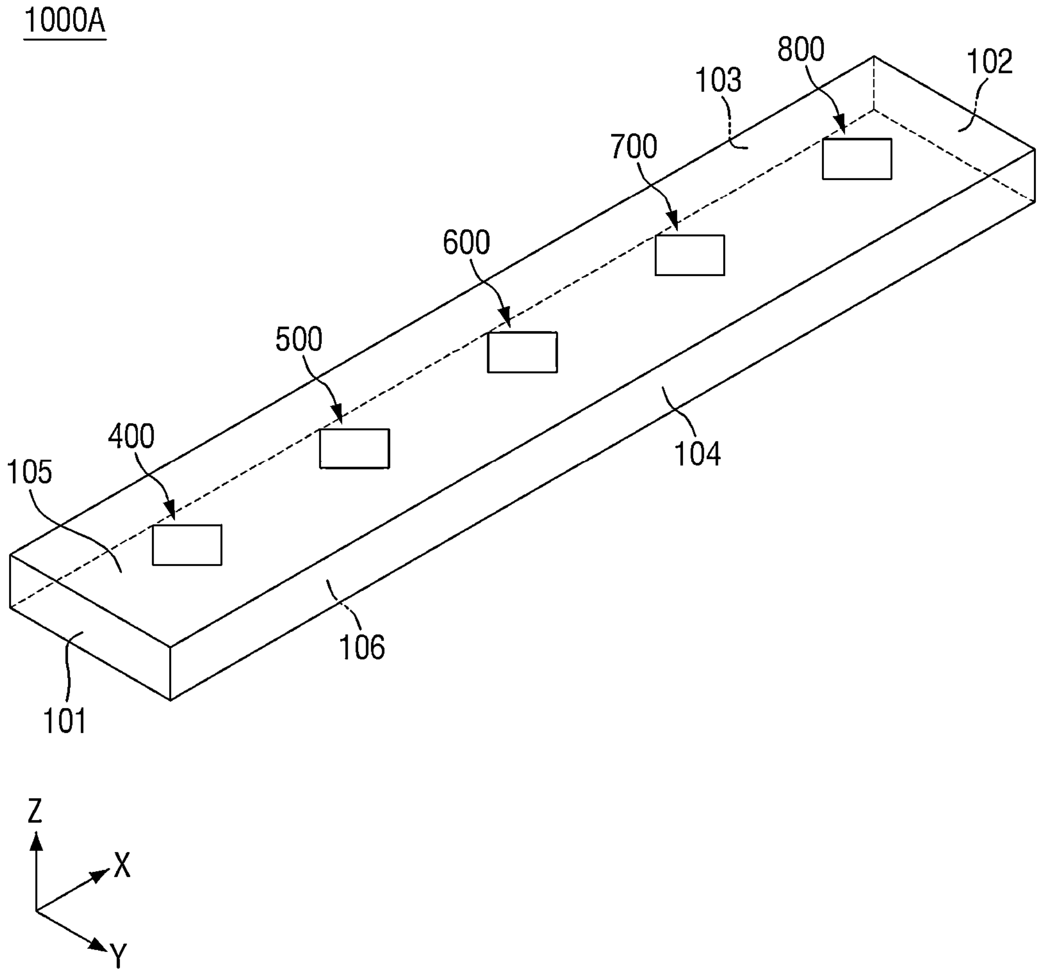
FIG. 4 is a diagram schematically showing an antenna array according to some embodiments.
Figure 5:
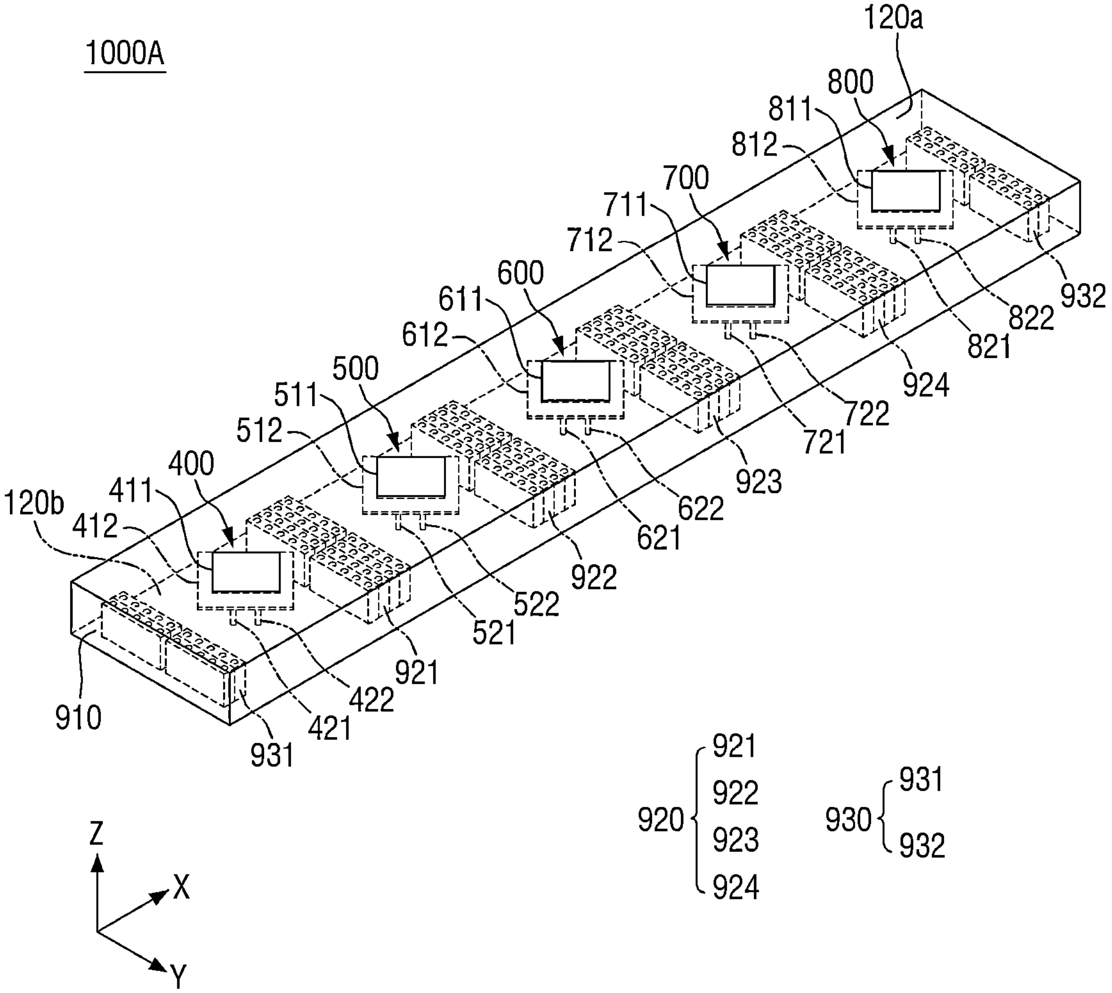
FIG. 5 is a diagram schematically showing an antenna array according to some embodiments.
Figure 6:
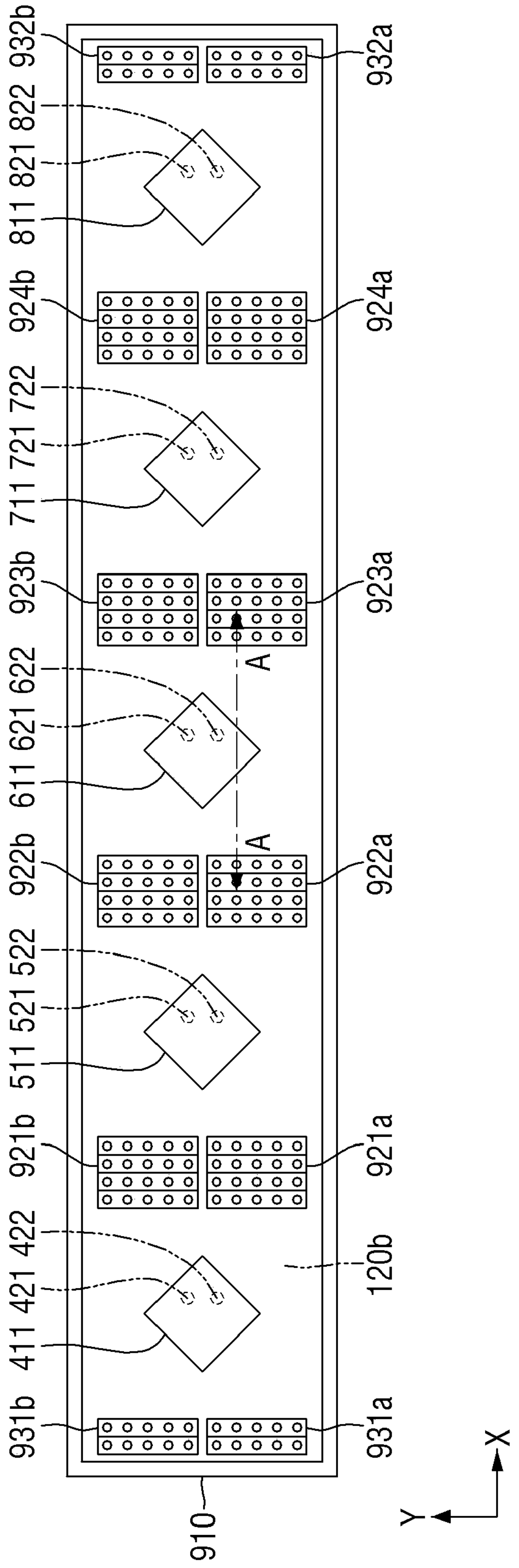
FIG. 6 is a schematic top view of the antenna array of FIG. 5.
Figure 7:
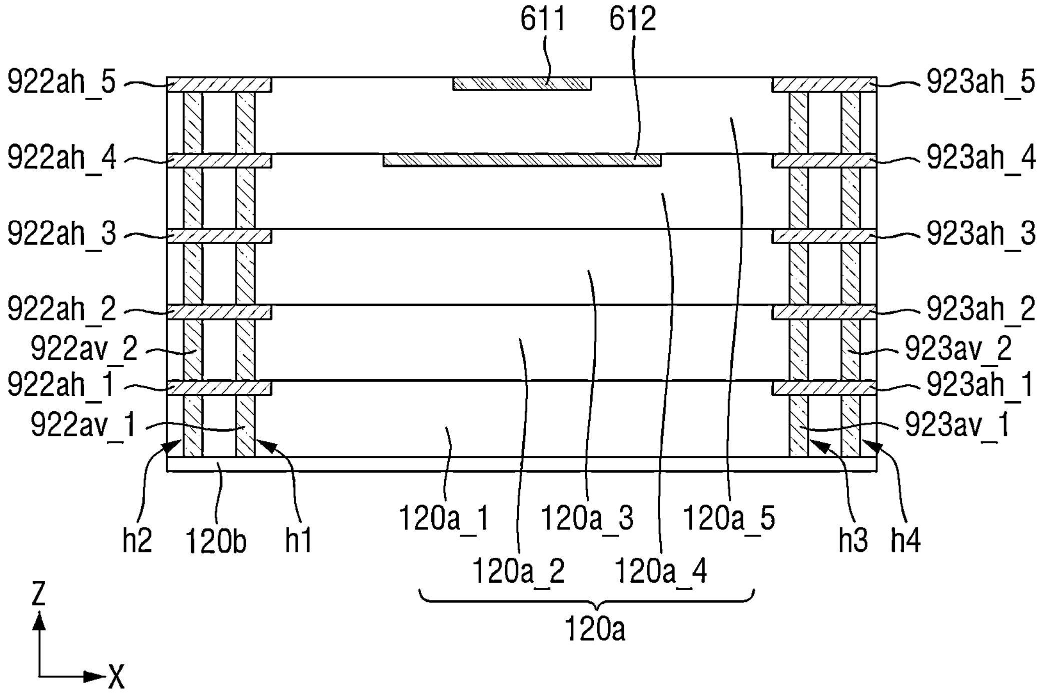
FIG. 7 is a cross-sectional view taken along a line A-A of FIG. 6.

FIG. 4 is a diagram schematically showing an antenna array according to some embodiments. FIG. 5 is a diagram schematically showing an antenna array according to some embodiments. FIG. 6 is a schematic top view of the antenna array of FIG. 5. FIG. 7 is a cross-sectional view taken along a line A-A of FIG. 6. For convenience of illustration, in FIG. 6, a fifth face 105 and the dielectric substrate 120*a* of the antenna array in FIG. 4 are not shown.

Referring to FIG. 2 and FIG. 4, an electronic device 20*a* may include the RFIC chip 200*a*, a first antenna module 400, a second antenna module 500, a third antenna module 600, a fourth antenna module 700 and a fifth antenna module 800. Each of the antenna modules 400, 500, 600, 700, and 800 as described below may mean an antenna element including the conductive patch. Further, an antenna array in which the antenna elements are arranged may mean an array of antenna modules connected to the RFIC chip 200*a*.

Referring to FIG. 4 to FIG. 6, the first to fifth antenna modules 400, 500, 600, 700, and 800 may constitute an antenna array 1000A.

The first antenna module 400 may include a plurality of feed lines 421 and 422 electrically connected to the RFIC chip 200*a* via a first feed line.

The first antenna module 400 may include a first conductive patch 411 for transmitting and/or receiving a signal of a first frequency band, and a second conductive patch 412 for transmitting and/or receiving a signal of a second frequency band different from the first frequency band.

The RFIC chip 200*a* may provide a signal to the feed lines 421 and 422 of the first antenna module 400 via the first feed line configured to provide at least one differential signal.

The first antenna module 400 may be connected, at the first conductive patch 411 and the second conductive patch 412 thereof, to the feed lines 421 and 422, respectively and thus may receive the differential signal from the RFIC chip 200*a*.

The first antenna module 400 may operate as a dual-polarized antenna in first and second frequency bands via the feed lines 421 and 422.

The second antenna module 500 may be spaced apart from the first antenna module 400 in the first direction X. The second antenna module 500 may include a plurality of feed lines 521 and 522 electrically connected to the RFIC chip 200*a* via a second feed line.

The second antenna module 500 may include a first conductive patch 511 for transmitting and/or receiving a signal in the first frequency band, and a second conductive patch 512 for transmitting and/or receiving a signal in the second frequency band different from the first frequency band.

The RFIC chip 200*a* may provide a signal to feed lines 521 and 522 of the second antenna module 500 via the second feed line configured to provide at least one differential signal.

The second antenna module 500 may be connected, at the first conductive patch 511 and the second conductive patch 512 thereof, to the feed lines 521 and 522, respectively and thus may receive a differential signal from the RFIC chip 200*a*.

The second antenna module 500 may operate as a dual-polarized antenna in the first and second frequency bands via the feed lines 521 and 522.

The third antenna module 600 may be spaced apart from the first and second antenna modules 400 and 500 in the first direction X.

The third antenna module 600 may include a plurality of feed lines 621 and 622 electrically connected to the RFIC chip 200*a* via a third feed line.

The third antenna module 600 may include a first conductive patch 611 for transmitting and/or receiving a signal of the first frequency band, and the second conductive patch 612 for transmitting and/or receiving a signal of the second frequency band different from the first frequency band.

The RFIC chip 200*a* may provide a signal to the feed lines 621 and 622 of the third antenna module 600 via the third feed line configured to provide at least one differential signal.

The third antenna module 600 may be connected, at the first conductive patch 611 and the second conductive patch 612 thereof, to the feed lines 621 and 622, respectively and thus may receive the differential signal from the RFIC chip 200*a*.

The third antenna module 600 may operate as a dual-polarized antenna in the first and second frequency bands via the feed lines 621 and 622.

The fourth antenna module 700 may be disposed to be spaced apart from the first to third antenna module 400, 500, and 600 in the first direction X.

The fourth antenna module 700 may include a plurality of feed lines 721 and 722 electrically connected to the RFIC chip 200*a* via a fourth feed line.

The fourth antenna module 700 may include a first conductive patch 711 for transmitting and/or receiving a signal of the first frequency band, and a second conductive patch 712 for transmitting and/or receiving a signal of the second frequency band different from the first frequency band.

The RFIC chip 200*a* may provide a signal to the feed lines 721 and 722 of the fourth antenna module 700 via the fourth feed line configured to provide at least one differential signal.

The fourth antenna module 700 may be connected, at the first conductive patch 711 and the second conductive patch 712 thereof, to the feed lines 721 and 722 respectively, and thus may receive the differential signal from the RFIC chip 200*a*.

The fourth antenna module 700 may operate as a dual-polarized antenna in the first and second frequency bands via the feed lines 721 and 722.

The fifth antenna module 800 may be spaced apart from the first to fourth antenna modules 400, 500, 600, and 700 in the first direction X.

The fifth antenna module 800 may include a plurality of feed lines 821 and 822 electrically connected to the RFIC chip 200*a* via a fifth feed line.

The fifth antenna module 800 may include a first conductive patch 811 for transmitting and/or receiving a signal of the first frequency band, and a second conductive patch 812 for transmitting and/or receiving a signal of the second frequency band different from the first frequency band.

The RFIC chip 200*a* may provide a signal to the feed lines 821 and 822 of the fifth antenna module 800 via the fifth feed line configured to provide at least one differential signal.

The fifth antenna module 800 may be connected, at the first conductive patch 811 and the second conductive patch 812 thereof, to the feed lines 821 and 822, respectively and thus may receive the differential signal from the RFIC chip 200*a*.

The fifth antenna module 800 may operate as a dual-polarized antenna in the first and second frequency bands via the feed lines 821 and 822.

In some embodiments, the first conductive patches 411, 511, 611, 711, and 811 may be disposed on a top face (e.g., 105 of FIG. 4) of the dielectric substrate 120*a*, while the second conductive patch 412, 512, 612, 712, and 812 may be disposed inside the dielectric substrate 120*a*. For example, in at least one example embodiment, the first conductive patches 411, 511, 611, 711, and 811 may be disposed on the second conductive patches 412, 512, 612, 712, and 812, respectively. However, the example embodiments are not limited thereto.

In some embodiments, a shape of each of the first and second conductive patches 411, 412, 511, 512, 611, 612, 711, 712, 811, and 812 of each of the first to fifth antenna modules 400, 500, 600, 700, and 800 may be various, for example, a rhombus shape, a rectangle shape, or a circle shape. However, the example embodiments are not limited thereto.

In some embodiments, it is shown that the number of the pairs of the feed lines of each of the antenna modules 400 to 800 is one. However, the technical idea of the present disclosure is not limited thereto. That is, the number of the pairs of the feed lines of each of the antenna modules 400 to 800 may be at least two.

Referring to FIG. 4, the antenna array 1000A may include first and second faces 101 and 102 facing each other in the first direction X, third and fourth faces 103 and 104 connecting the first and second faces 101 and 102 to each other and facing each other in the second direction Y intersecting the first direction X, and fifth and sixth faces 105 and 106 connecting the first to fourth faces 101, 102, 103, and 104 to each other, and facing each other in the third direction Z. In some embodiments, the fifth and sixth faces 105 and 106 may means a top face and a bottom face of the antenna array 1000A, respectively, and the first to fourth faces 101, 102, 103, and 104 may mean the plurality of side faces of the antenna array 1000A.

A first metal partition-wall 910 may be disposed at an outer edge of the antenna array 1000A so as to cover second and third metal partition-walls 920 and 930 to be described later. The first metal partition-wall 910 may be formed to surround the first to fourth faces 101, 102, 103, and 104 of the antenna array 1000A.

The first metal partition-wall 910 may be formed by sputtering a conductive material onto the plurality of side faces 101, 102, 103, and 104 of the antenna array 1000A. According to some embodiments, a separate process of removing the conductive material layer formed on the plurality of side faces 101, 102, 103, and 104 of the antenna array 1000A by the sputtering process is not performed, and the number of processes may be reduced than that in a conventional case.

The second metal partition-wall 920 may be a noncontiguous partition-wall. For example, the second metal partitional-wall 920 may include a plurality of second metal partitional-walls (e.g., 921, 922, 923, and/or 924) and each of a plurality of second metal partition-walls 920 may be arranged to be spaced apart from each other in the first direction X and may be disposed between adjacent ones of the plurality of antenna modules 400 to 800.

Additionally, the second metal partition-wall 920 may include a second_first metal partition-wall 921*a* and a second_second metal partition-wall 921*b* spaced apart from each other in the second direction Y, and extending in the second direction Y, and disposed between the first and second antenna modules 400 and 500. The second metal partition-wall 920 may include a second_third metal partition-wall 922*a* and a second_fourth metal partition-wall 922*b* spaced apart from each other in the second direction, and extending in the second direction Y, and disposed between the second and third antenna modules 500 and 600. The second metal partition-wall 920 may include a second_fifth metal partition-wall 923*a* and a second_sixth metal partition-wall 923*b* spaced apart from each other in the second direction Y, and extending in the second direction Y, and disposed between the third and fourth antenna modules 600 and 700. The second metal partition-wall 920 may include a second_seventh metal partition-wall 924*a* and a second_eighth metal partition-wall 924*b* spaced apart from each other in the second direction Y, and extending in the second direction Y, and disposed between the fourth and fifth antenna modules 700 and 800.

The third metal partition-wall 930 may be a noncontiguous partition-wall. For example, the third metal partitional-wall 930 may include a plurality of third metal partitional-walls (e.g., 931 and 932) such that the third metal partition-wall 930 may be disposed between an outer edge of the antenna array 1000A and each of outer antenna modules 400 and 800. For example, the third metal partition-wall 930 may be disposed between the first antenna module 400 and the first face 101 of the antenna array 1000A and between the fifth antenna module 800 and the second face 102 of the antenna array 1000A.

Additionally, the third metal partition-wall 930 may include a third_first metal partition-wall 931*a* and a third_second metal partition-wall 931*b* spaced apart from each other in the second direction Y, and extending in the second direction Y, and disposed between the first antenna module 400 and the first metal partition-wall 910. The third metal partition-wall 930 may include a third_third metal partition-wall 932*a* and a third_fourth metal partition-wall 932*b* spaced apart from each other in the second direction Y, and extending in the second direction Y, and disposed between the fifth antenna module 800 and the first metal partition-wall 910.

Each of the second and third metal partition-walls 920 and 930 may receive therein a metal via extending through a plurality of dielectric substrate 120*a* in the third direction Z.

For example, referring to FIG. 6 and FIG. 7, each of the second_third metal partition-wall 922*a* and the second_fifth metal partition-wall 923*a* may receive therein a metal via extending through at least a portion of each of a plurality of dielectric substrates 120*a*_1, 120*a*_2, 120*a*_3, 120*a*_4, and 120*a*_5 in the third direction Z. For example, the second_third metal partition-wall 922*ah*_1 may receive therein a second_third_first metal via 922*av*_1 and a second_third_second metal via 922*av*_2. The second_fifth metal partition-wall 923*ah*_1 may include a second_fifth_first metal via 923*av*_1 and a second_fifth_second metal via 923*av*_2.

Further, the second_third metal partition-wall 922*ah*_2 may receive therein at least second_third_first to second_third_fifth metal pads 922*ah*_1, 922*ah*_2, 922*ah*_3, 922*ah*_4, and 922*ah*_5. Each of the second_third_first metal via 922*av*_1 and the second_third_second metal via 922*av*_2 may be disposed between and electrically connected to adjacent ones of the second_third_first to second_third_fifth metal pads 922*ah*_1, 922*ah*_2, 922*ah*_3,

922*ah*_4, and 922*ah*_5 and between the second_third_first meal pad 922*ah*_1 and a ground plane 120*b*.

The second_fifth metal partition-wall 923*a* may receive therein second_fifth_first to second_fifth_fifth metal pads 923*ah*_1, 923*ah*_2, 923*ah*_3, 923*ah*_4, and 923*ah*_5. Each of the second_fifth_first metal via 923*av*_1 and the second_fifth 2 metal via 923*av*_2 may be disposed between and electrically connected to adjacent ones of the second_fifth_first to second_fifth_fifth metal pads 923*ah*_1, 923*ah*_2, 923*ah*_3, 923*ah*_4, 923*ah*_5 and between the second_fifth_first metal pad 923*ah*_1 and the ground plane 120*b*.

A plurality of metal vias may be formed so as to be exposed to one face of the ground plane 120*b*. Each of the plurality of metal vias may include a via hole and a conductive material formed along and on an inner wall of the via hole.

For example, the metal via received in the second_third metal partition-wall 922*a* may include the second_third_first metal via 922*av*_1 and the second_third_second metal via 922*av*_2 formed so as to be exposed to one face of the ground plane 120*b*. The second_third_first metal via 922*av*_1 may include a first via hole h1 and a conductive material formed along and on an inner wall of the first via hole h1. The second_third_second metal via 922*av*_2 may include a second via hole h2*a* and a conductive material formed along and on an inner wall of the second via hole h2.

Further, the metal via received in the second_fifth metal partition-wall 923*a* may include the second_fifth_first metal via 923*av*_1 and the second_fifth_second metal via 923*av*_2 formed so as to be exposed to one face of the ground plane 120*b*. The second_fifth_first metal via 923*av*_1 may include a third via hole h3 and a conductive material formed along and on an inner wall of the third via hole h3. The second_fifth_second metal via 923*av*_2 may include a fourth via hole h4*a* and a conductive material formed along and on an inner wall of the fourth via hole h4.

In FIG. 7, only a shape of the metal via received in the second metal partition-wall 920 disposed between the third and fourth antenna modules 600 and 700 is illustrated by way of example. However, the example embodiments are not limited thereto. For example, the descriptions of the metal via as described above may be equally applied to descriptions of the metal via received in each of the second to fourth metal partition-walls 920, 930, and 940. Furthermore, more or fewer metal pads and/or vias may be included in each metal partition wall.

Figure 8:
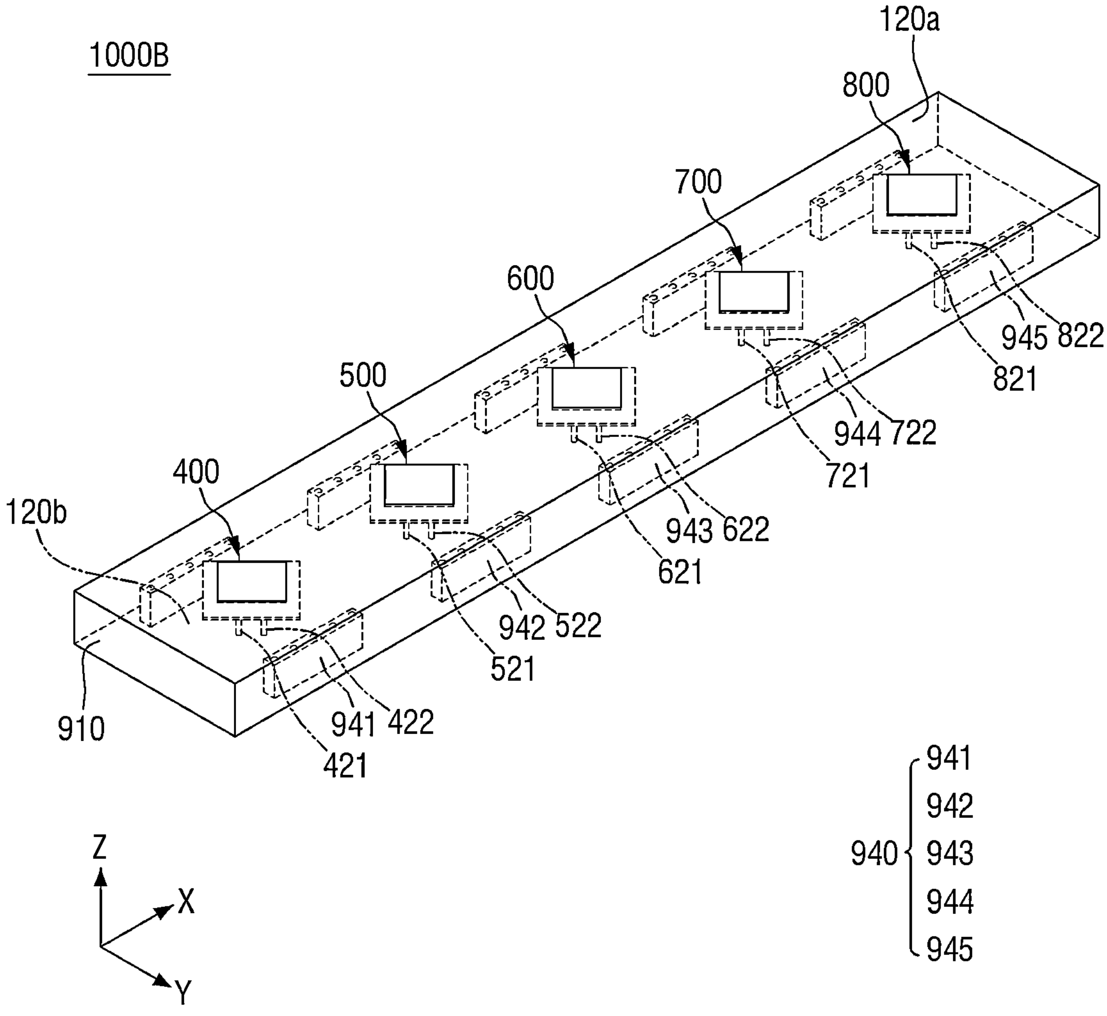
FIG. 8 is a diagram schematically showing an antenna array according to some embodiments.
Figure 9:
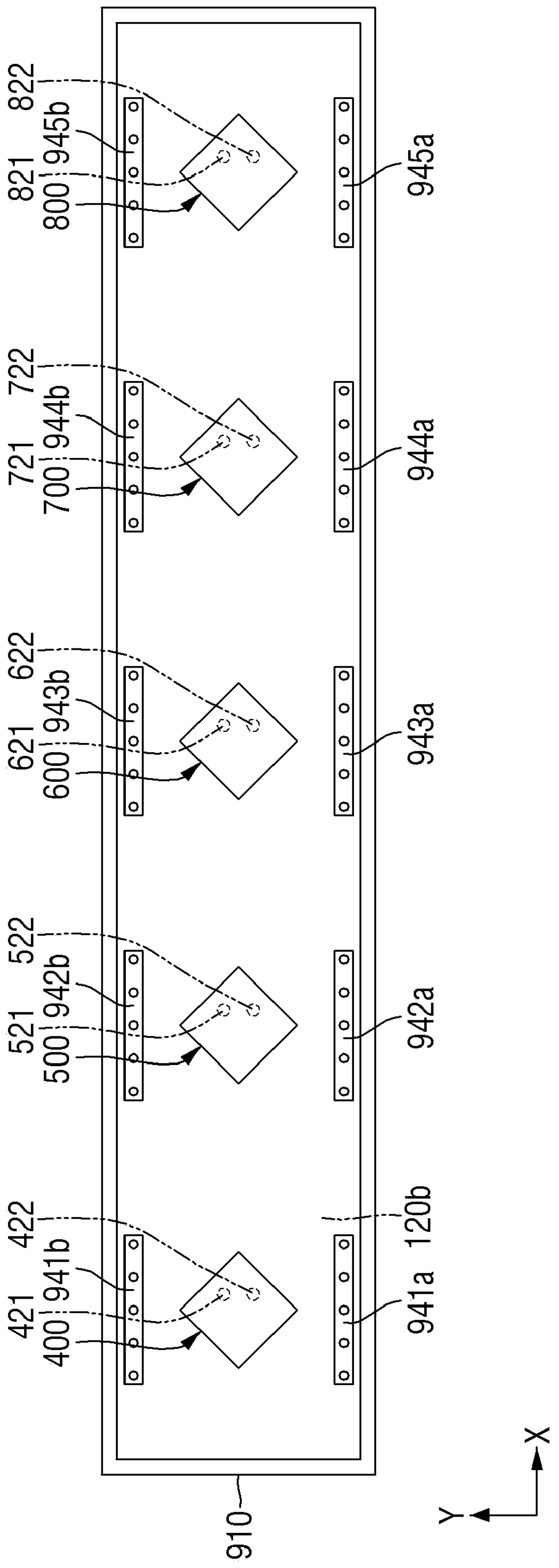
FIG. 9 is a schematic top view of the antenna array of FIG. 8.

FIG. 8 is a diagram schematically showing an antenna array according to some embodiments. FIG. 9 is a schematic top view of the antenna array of FIG. 8. For convenience of illustration, those duplicate descriptions with regards to FIG. 4 to FIG. 7 may be omitted.

The first metal partition-wall 910 may be disposed at an outer edge of an antenna array 1000B so as to cover a fourth metal partition-wall 940 to be described later. The first metal partition-wall 910 may be formed by a sputtering process so as to surround the first to fourth faces 101, 102, 103, and 104 of the antenna array 1000B.

The fourth metal partition-wall 940 may be disposed between the third face 103 and each of the antenna modules 400 to 800 of the antenna array 1000B and between the fourth face 104 and each of the antenna modules 400 to 800 of the antenna array 1000B.

The fourth metal partition-wall 940 may include a plurality of fourth metal partition-walls 941, 942, 943, 944, and 945 extending in the first direction X and disposed in a corresponding manner to the antenna module 400 to 800, respectively. In one example, a length along the first direction X of each of the fourth metal partition-wall 940 and the metal via received therein may be adjusted to comply with the desired antenna characteristics.

For example, the fourth metal partition-wall 940 may include a fourth_first metal partition-wall 941*a* and a fourth_second metal partition-wall 941*b* spaced apart from each other in the second direction, and extending in the first direction X, and disposed between the first antenna module 400 and the first metal partition-wall 910. The fourth metal partition-wall 940 may include a fourth_third metal partition-wall 942*a* and a fourth_fourth metal partition-wall 942*b* spaced apart from each other in the second direction Y, and extending in the first direction X, and disposed between the second antenna module 500 and the first metal partition-wall 910. The fourth metal partition-wall 940 may include a fourth_fifth metal partition-wall 943*a* and a fourth_sixth metal partition-wall 943*b* spaced apart from each other in the second direction Y, and extending in the first direction X, and disposed between the third antenna module 600 and the first metal partition-wall 910. The fourth metal partition-wall 940 may include a fourth_seventh metal partition-wall 944*a* and a fourth_eighth metal partition-wall 944*b* spaced apart from each other in the second direction Y, and extending in the first direction X, and disposed between the fourth antenna module 700 and the first metal partition-wall 910. The fourth metal partition-wall 940 may include a fourth_ninth metal partition-wall 945*a* and a fourth_tenth metal partition-wall 945*b* spaced apart from each other in the second direction Y, and extending in the first direction X, and disposed between the fifth antenna module 800 and the first metal partition-wall 910.

In at least one example, a vertical dimension along the third direction Z of each of the fourth metal partition-wall 940 and a metal via received therein may be adjusted to comply with the desired antenna characteristics.

Figure 10:
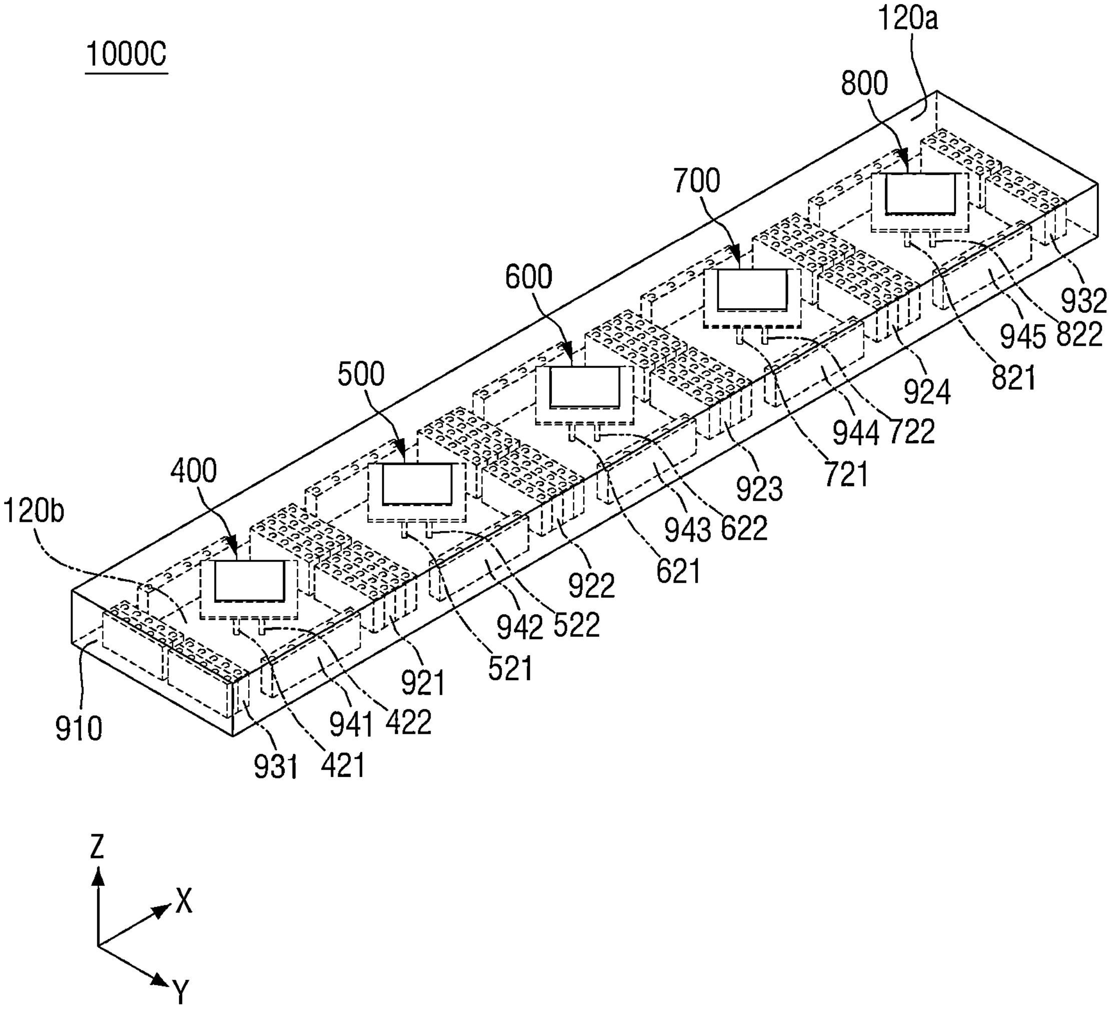
FIG. 10 is a diagram schematically showing an antenna array according to some embodiments.
Figure 11:
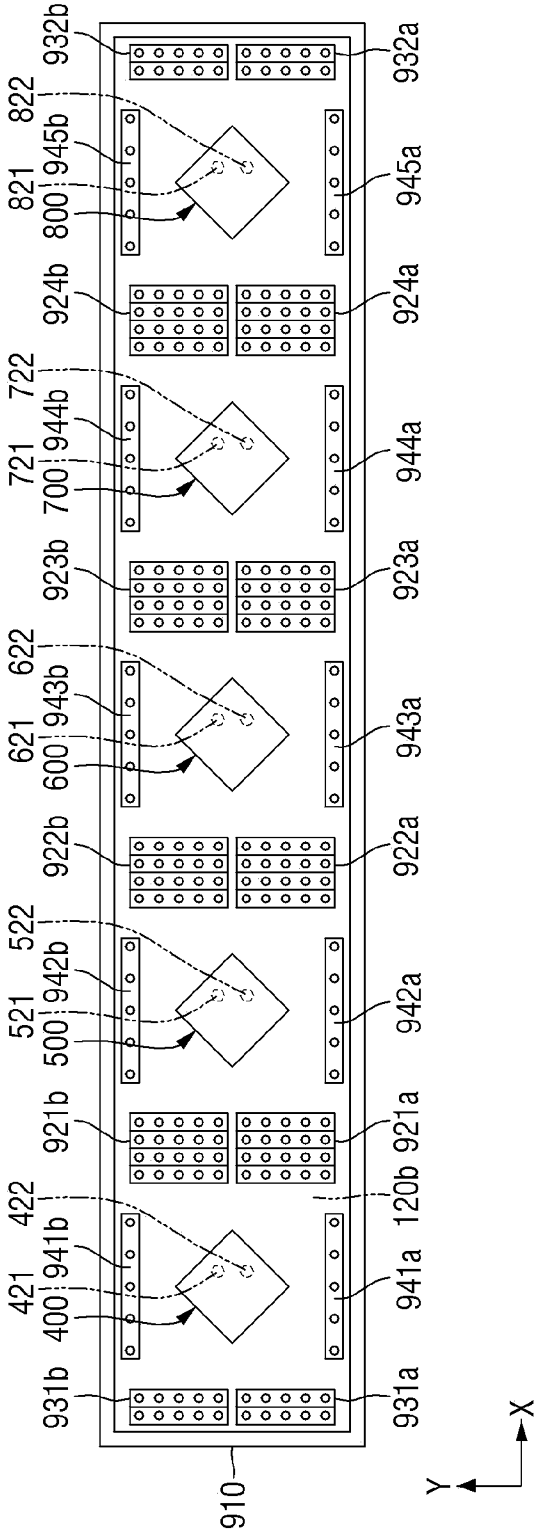
FIG. 11 is a schematic top view of the antenna array of FIG. 10.

FIG. 10 is a diagram schematically showing an antenna array according to some embodiments. FIG. 11 is a schematic top view of the antenna array of FIG. 10. For convenience of illustration, those duplicate descriptions with regards to FIG. 4 to FIG. 9 may be omitted.

An antenna array 1000C may include the first to fourth metal partition-walls 910, 920, 930, and 940.

The first metal partition-wall 910 may be disposed at an outer edge of the antenna array 1000C so as to cover the second to fourth metal partition-walls 920, 930, and 940.

The first metal partition-wall 910 may be disposed on the first to fourth faces 101, 102, 103, and 104. The first metal partition-wall 910 may be disposed at the outer edge of the antenna array 1000C so as to surround the second to fourth metal partition-walls 920, 930, and 940.

The second metal partition-wall 920 extends in the second direction Y. The second metal partition-wall 920 may be disposed between the first and second antenna modules 400 and 500. The fourth metal partition-wall 940 may extend in the first direction Z.

The third metal partition-wall 930 may be disposed between each of outer antenna modules 400 and 800 and the outer edge of the antenna array 1000C.

Each of the second to fourth metal partition-walls 920, 930, and 940 may receive therein a metal via extending through the plurality of dielectric substrate 120*b* in the third direction Z so as to be exposed to the ground plane.

Figure 12:
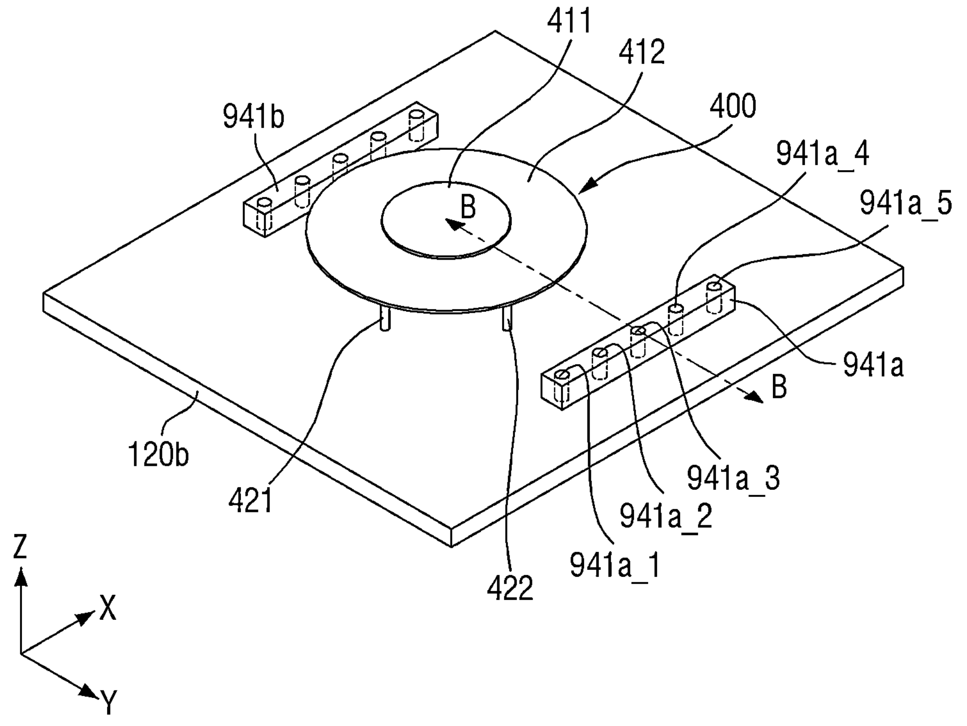
FIG. 12 is a diagram for illustrating an antenna module of an antenna array according to some embodiments.
Figure 13:
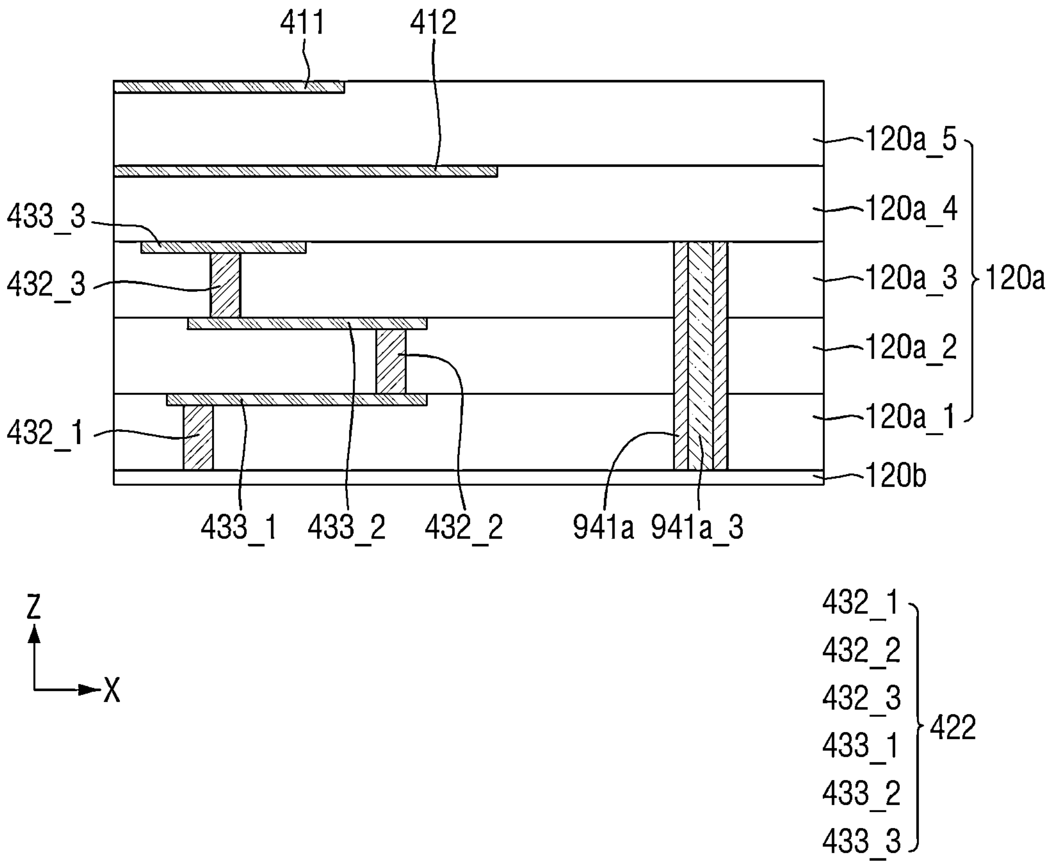
FIG. 13 is a cross-sectional view taken along a line B-B in FIG. 12.

FIG. 12 is a diagram for illustrating an antenna module of an antenna array according to some embodiments. FIG. 13 is a cross-sectional view taken along a line B-B in FIG. 12. For convenience of illustration, those duplicate with the descriptions made based on FIG. 4 to FIG. 11 may be omitted. For convenience of illustration, in FIG. 12, the dielectric substrate 120*a* of FIG. 13 may be omitted.

At least one of the feed lines of each of the antenna modules 400 to 800 may be formed in a meander shape.

For example, referring to FIG. 12 and FIG. 13, one feed line 422 of the first antenna module 400 may include a plurality of conductive lines 433_1, 433_2, and 433_3 electrically connected to the ground plane 120*b* and a plurality of feed vias 432_1, 432_2, and 432_3 electrically connecting the plurality of conductive lines 433_1, 433_2, and 433_3 to each other. In some example embodiments, the feed vias 432_1, 432_2, and 432_3 of the feed line 422 may not overlap each other in the third direction Z. For example, the feed line 422 may extend in a meander shape.

In FIG. 12 to FIG. 13, a shape of the feed via only in an example in which the fourth metal partition-wall 940 is formed is illustrated by way of an example. However, the example embodiments are not limited thereto. For example, the description of the feed via as made above may be equally applied to descriptions of the feed via included in each of the antenna arrays 1000A, 1000B, and 1000C according to some embodiments.

FIG. 14 to FIG. 21 is a diagram for illustrating effects of the antenna array according to some embodiments.

Figure 14:
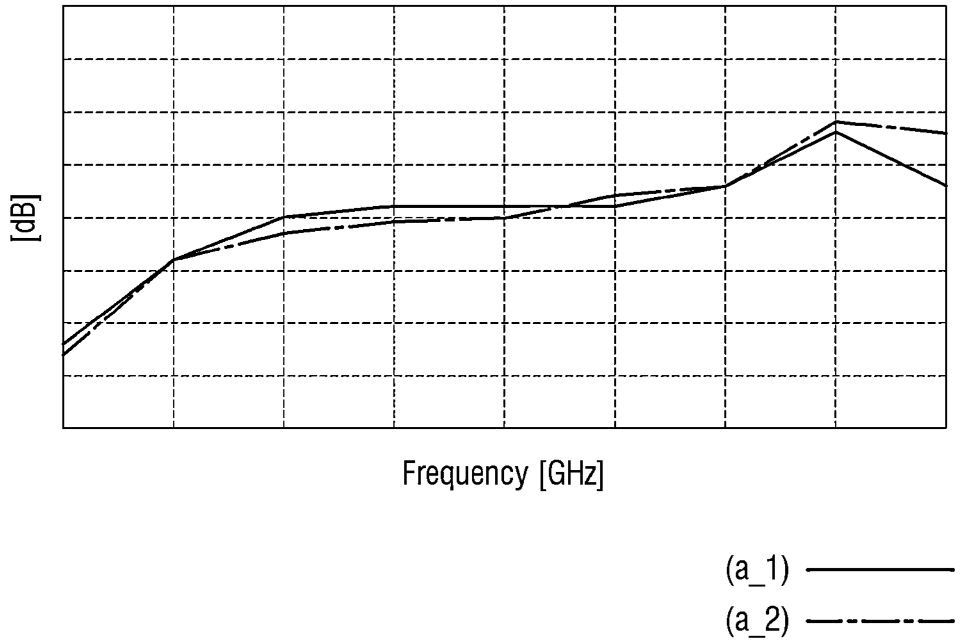
FIG. 14 to FIG. 21 are diagrams for illustrating the effects of the antenna array according to some embodiments.
Figure 15:
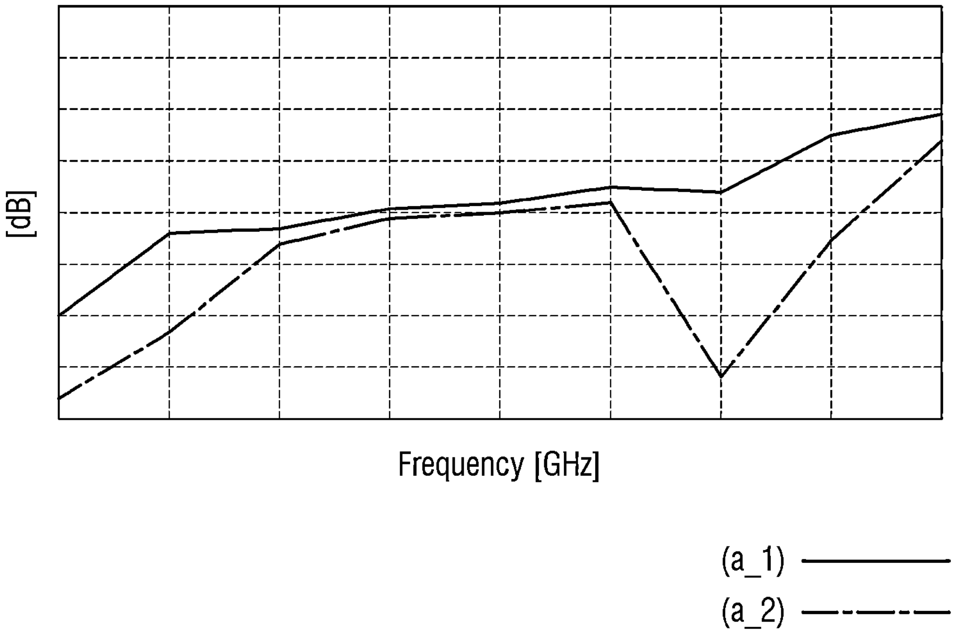

Referring to FIG. 14 and FIG. 15, the antenna characteristic (a_1) when the first to third metal partition-walls 910 to 930 according to some embodiments are present, and the antenna characteristic (a_2) when the first to third metal partition-walls 910 to 930 are absent may be compared with each other. FIG. 14 is a graph showing the antenna characteristics when the antenna array according to some embodiments is present as a separate unit. FIG. 15 is a graph showing the antenna characteristics when the antenna array according to some embodiments is mounted in a housing of, for example, a portable wireless communication device.

Based FIG. 14 and FIG. 15, it may be identified that the antenna characteristics are further improved when the antenna array is mounted in the housing. For example, when the antenna array according to some embodiments is mounted in the housing, influence by other adjacent components thereto received within the housing may be minimized. As a result, further improved antenna gain may be secured when the antenna array is received in the housing.

Figure 16:
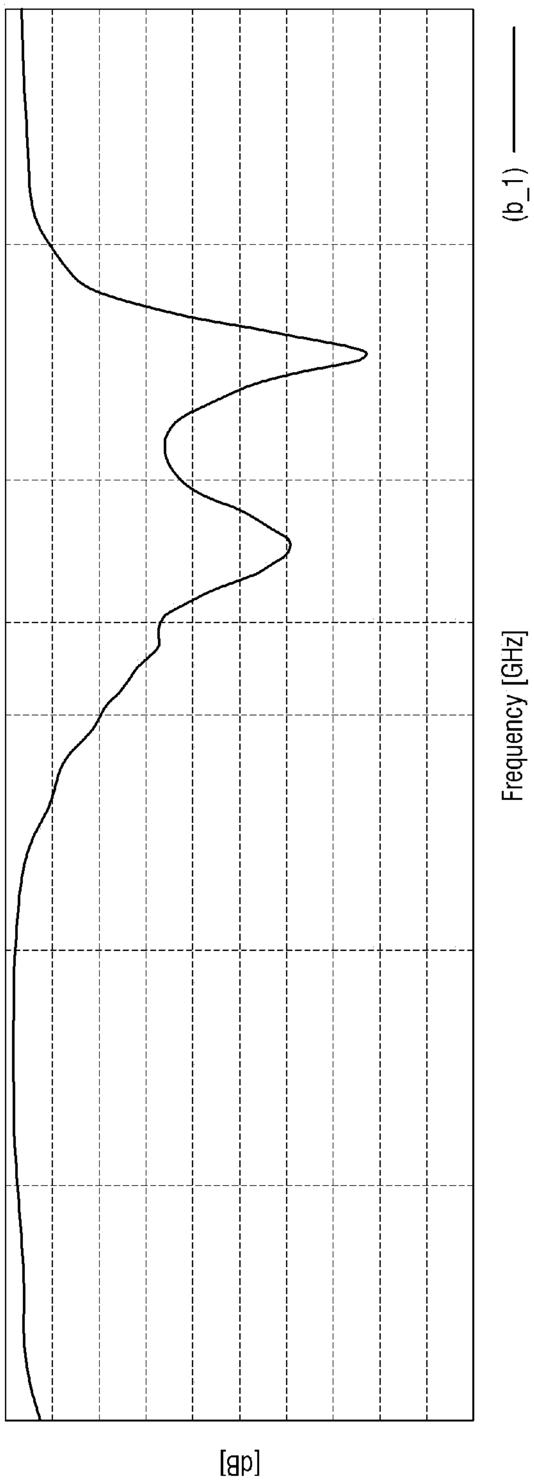
Figure 17:
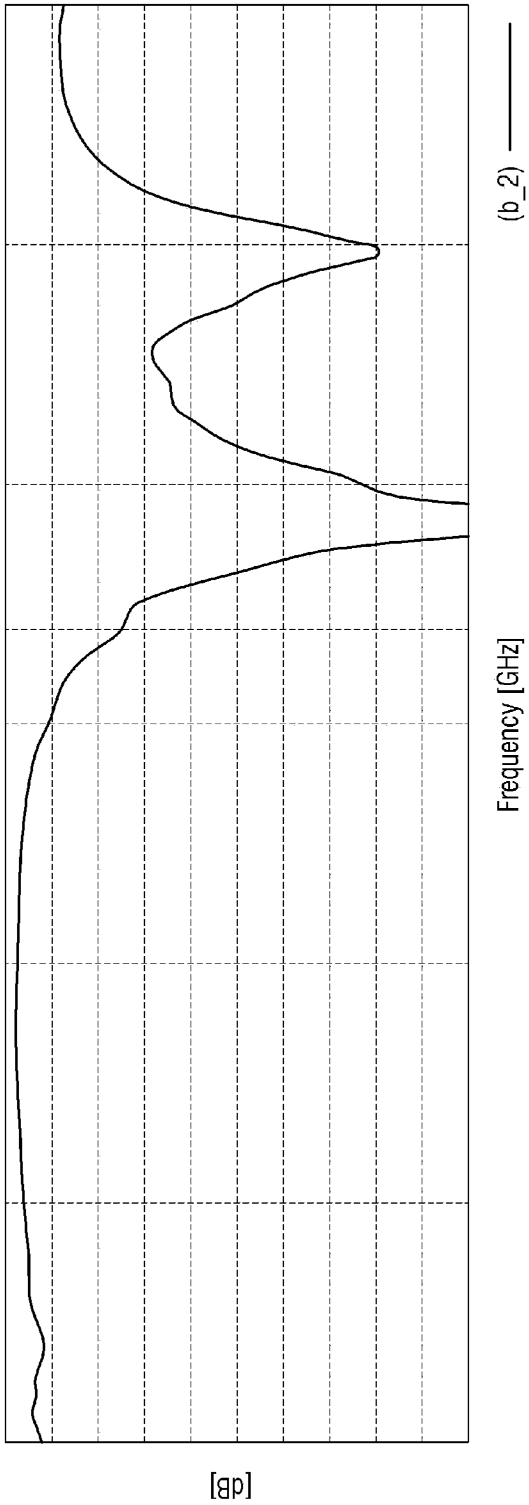

Referring to FIG. 16, a reflection loss (b_1) when the first to third metal partition-walls 910 to 930 according to some embodiments are present is shown. Referring to FIG. 17, a reflection loss (b_2) when the first to third metal partition-walls 910 to 930 according to some embodiments are absent is shown.

Based on FIG. 16 and FIG. 17, it may be identified that isolation characteristics between the antenna modules may be further improved due to the first to third metal partition-walls 910 to 930. As a result, S-parameter characteristics may be improved and uniformly maintained despite phase change of the signals applied when the antenna array is operating.

Figure 18:
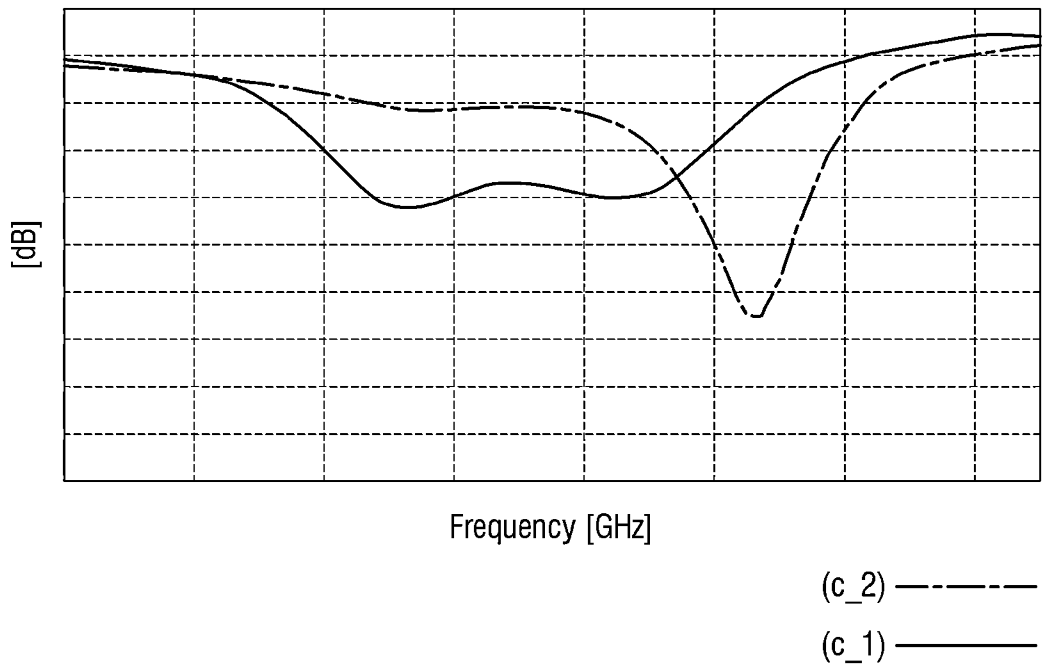
Figure 19:
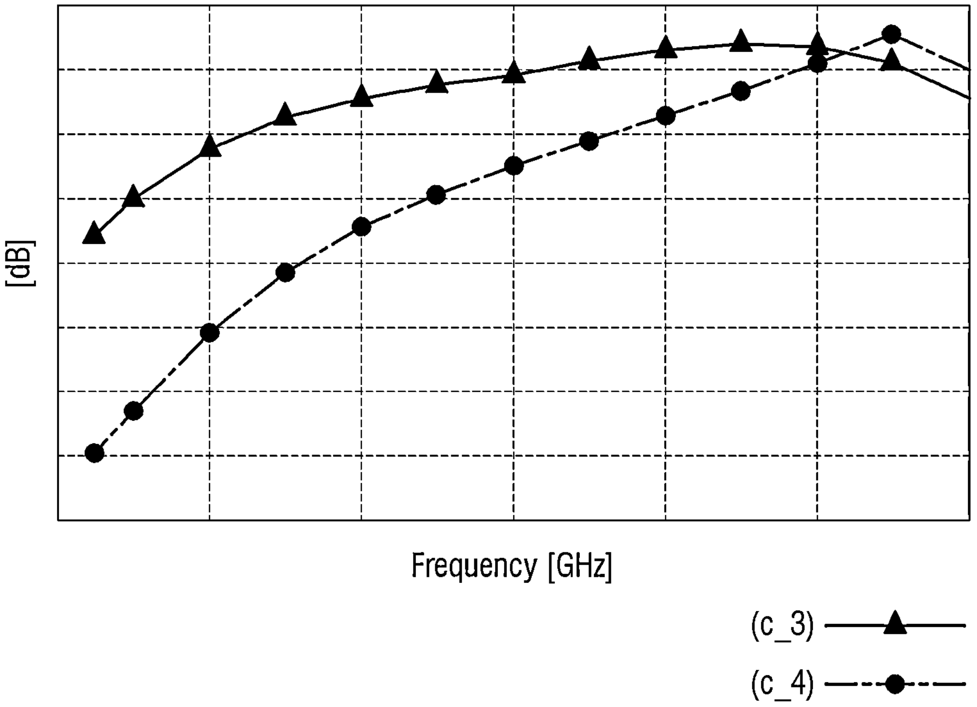

Referring to FIG. 18, a reflection loss (c_1) when the fourth metal partition-wall 940 according to some embodiments is present and a reflection loss (c_2) when the fourth metal partition-wall 940 according to some embodiments is absent may be compared with each other. Referring to FIG. 19, an antenna gain (c_3) when the fourth metal partition-wall 940 according to some embodiments is present and an antenna gain (c_4) when the fourth metal partition-wall 940 according to some embodiments is absent may be compared with each other.

Referring to FIG. 18 and FIG. 19, a dimension of a ground may be larger by a vertical dimension along the third direction Z of the metal via received in the fourth metal partition-wall 940, such that the antenna operates in a wide band. As a result, an intensity of a fringing field may be easily adjusted so that the matching characteristic may be improved.

Figure 20:
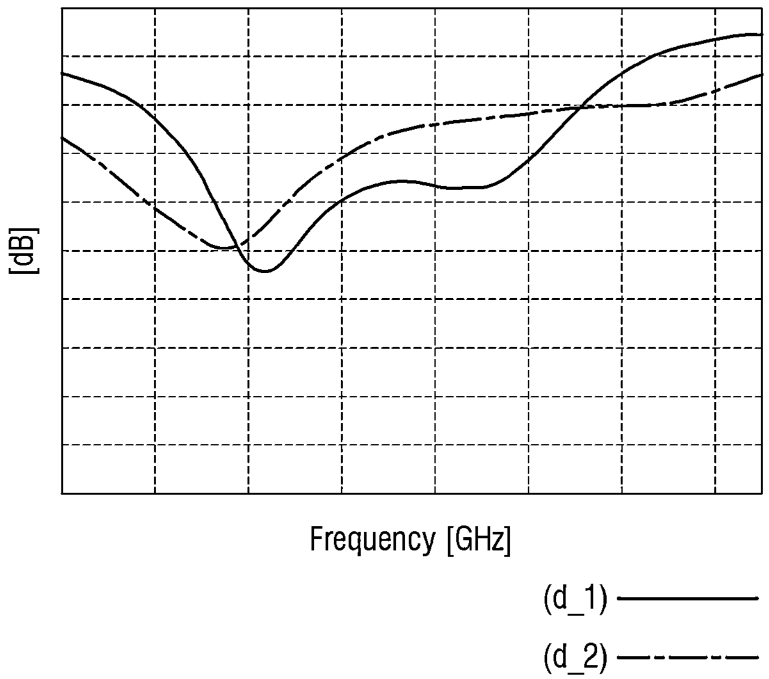
Figure 21:
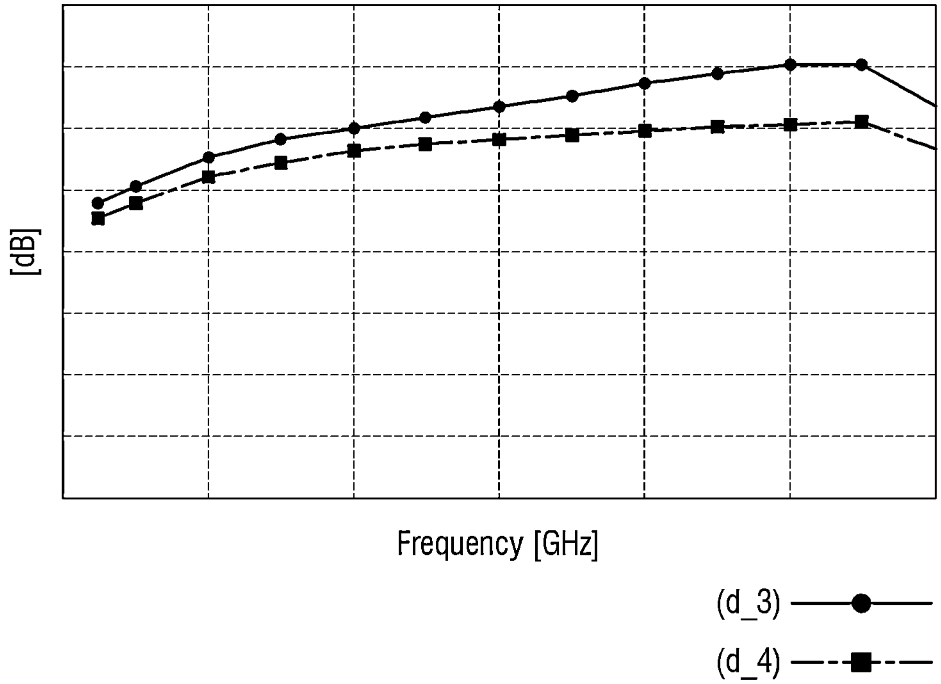

Referring to FIG. 20, a reflection loss (d_1) when the feed line of the meander shape according to some embodiments is present, and a reflection loss (d_2) when the feed line of the meander shape according to some embodiments is absent may be compared with each other. Referring to FIG. 21, an antenna gain (d_3) when the feed line of the meander shape according to some embodiments is present, and an antenna gain (d_4) when the feed line of the meander shape according to some embodiments is absent may be compared with each other.

Referring to FIG. 20 and FIG. 21, when the meander-shaped feed line is present, a coupling area between the feed line and the conductive patch increases, such that the antenna operates in a wide band.

Figure 22:
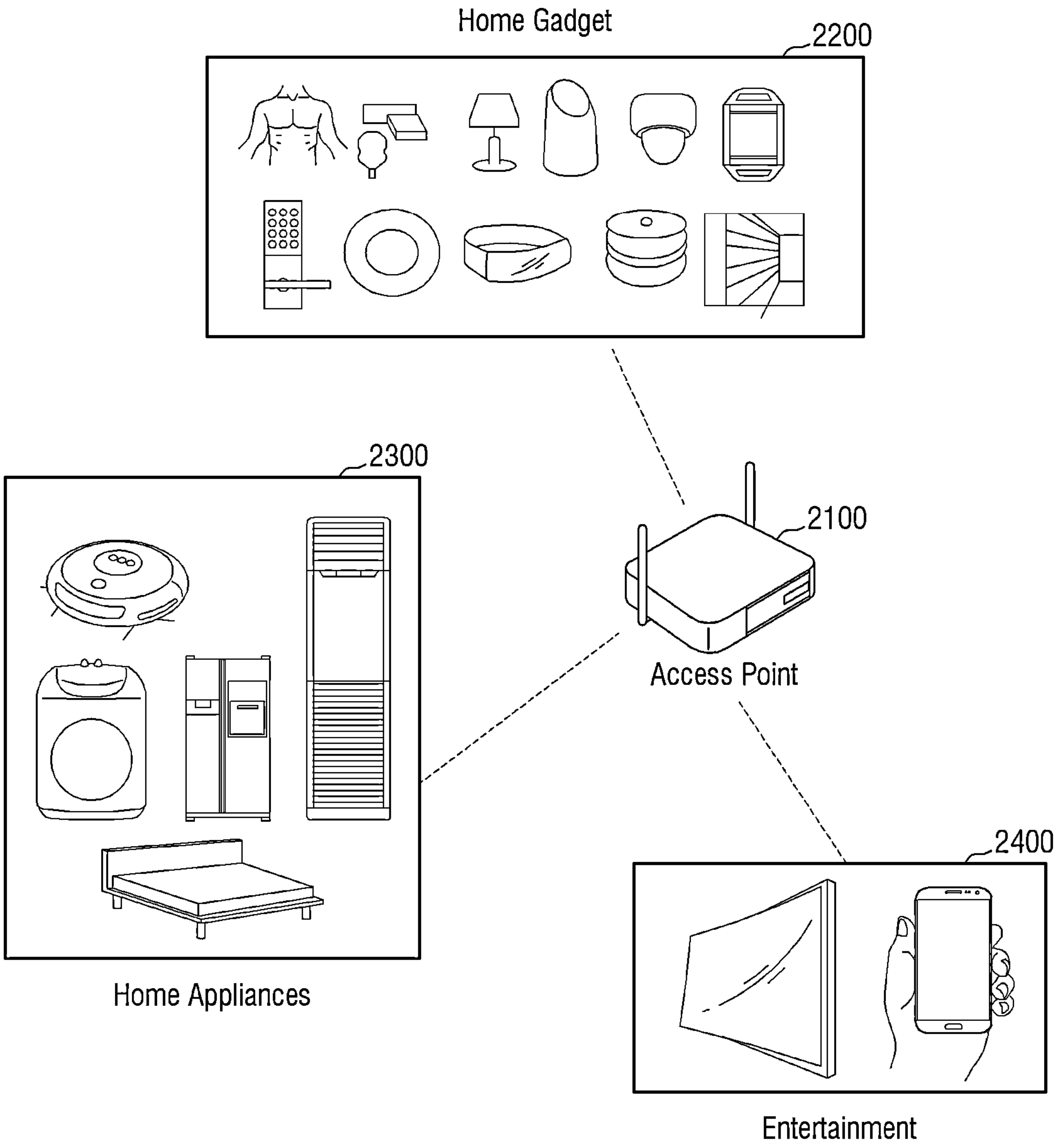
FIG. 22 is a diagram schematically showing a communication device including an antenna array according to some embodiments.

FIG. 22 is a diagram schematically showing a communication device including an antenna array according to some embodiments.

Specifically, FIG. 22 shows an example in which various wireless communication devices communicate with each other in a wireless communication system using WLAN. Each of the various wireless communication devices shown in FIG. 22 may include a multi-feed antenna, and may include the RFIC that provides a differential signal to the multi-feed antenna, as discussed above.

A home gadget 2200, a home appliance 2300, an entertainment device 2400, and an access point (AP) 2100 may constitute an IoT (Internet of Things) network system. Each of the home gadget 2200, the home appliance 2300, the entertainment device 2400, and the AP 2100 may include a transceiver according to some embodiments as a component. The home gadget 2200, the home appliance 2300, and the entertainment device 2400 may wirelessly communicate with the AP 2100, and thus may wirelessly communicate with each other via the AP 2100.

Although embodiments of the present disclosure have been described with reference to the accompanying drawings, the present disclosure is not limited to the above embodiments, but may be implemented in various different forms. A person skilled in the art may appreciate that the present disclosure may be practiced in other concrete forms without changing the technical spirit or essential characteristics of the present disclosure. Therefore, it should be understood that the embodiments as described above are illustrative in all respects and not restrictive.

What is claimed is:

1. An electronic device comprising:

a radio frequency integrated circuit (RFIC) chip; and an antenna array electrically connected to the RFIC chip, the antenna array including a first face and a second face facing each other in a first direction, and a third face and a fourth face connecting the first and second faces to each other and facing each other in a second direction intersecting the first direction, the antenna array including a plurality of substrates sequentially stacked in a third direction intersecting a plane defined by the first and second directions, first and second antenna modules on the plurality of substrates and sequentially arranged along the first direction, a first metal partition-wall including at least one metal via extending through the plurality of substrates in the third direction, and a second metal partition-wall surrounding the first to fourth faces, the first and second antenna modules, and the first metal partition-wall, and wherein the first metal partition-wall is arranged at a periphery of each of the first and second antenna modules but does not completely surround each of the first and second antenna modules.

2. The device of claim 1, wherein the first metal partition-wall is between the first and second antenna modules and extends in the second direction, and wherein the first metal partition-wall is a noncontiguous partition wall including a plurality of portions spaced apart from each other in the second direction.

3. The device of claim 1, wherein the first metal partition-wall is between the first antenna module and the second metal partition-wall and extends in the second direction, and wherein the first metal partition-wall is a noncontiguous partition wall including a plurality of portions spaced apart from each other in the second direction.

4. The device of claim 1, wherein the first metal partition-wall is between the first antenna module and the second metal partition-wall and extends in the first direction, and wherein the first metal partition-wall includes at least a first portion and a second portion spaced apart from each other in the second direction.

5. The device of claim 1, wherein the second metal partition-wall encircles an outer edge of the antenna array so as to cover the first metal partition-wall.

6. The device of claim 1, wherein the at least one metal via includes a plurality of metal vias exposed in at least one face of a ground plane, and wherein each of the plurality of metal vias includes a conductive material in a via hole defined by the plurality of substrates.

7. The device of claim 6, wherein the first antenna module includes a first feed line electrically connected to the RFIC chip, wherein the second antenna module includes a second feed line electrically connected to the RFIC chip, wherein the first feed line includes a plurality of conductive lines electrically connected to the ground plane and a plurality of feed vias electrically connecting the plurality of conductive lines to each other, and wherein the first feed line extends in the third direction in a meander shape.

8. The device of claim 7, wherein the antenna array further includes:

a third antenna module spaced apart from the second antenna module in the first direction, and electrically connected to the RFIC chip via a third feed line, a fourth antenna module spaced apart from the third antenna module in the first direction, and electrically connected to the RFIC chip via a fourth feed line, and a fifth antenna module spaced apart from the fourth antenna module in the first direction, and electrically connected to the RFIC chip via a fifth feed line.

9. The device of claim 1, wherein the second metal partition-wall is formed using a sputtering method.

10. An electronic device comprising:

a radio frequency integrated circuit (RFIC) chip; and an antenna array electrically connected to the RFIC chip, wherein the antenna array has first and second faces facing each other in a first direction, and a plurality of side faces connecting the first and second faces to each other, the antenna array including a ground plane on the first face, a plurality of dielectric substrates sequentially stacked on the ground plane in a third direction, a plurality of antenna modules on the plurality of dielectric substrates and spaced apart from each other in the first direction, a first metal partition-wall covering the plurality of side faces, and at least one second metal partition-wall including a ground via connected to the ground plane, wherein the first metal partition-wall surrounds the plurality of antenna modules and the at least one second metal partition-wall, and the least one second metal partition-wall is arranged at a periphery of each of the plurality of antenna modules but does not completely surround each of the plurality of antenna modules.

11. The device of claim 10, wherein the at least one second metal partition-wall extends in in a second direction intersecting the first direction and includes a second metal partition-wall between adjacent ones of the plurality of antenna modules and a second metal partition-wall between each of the plurality of antenna modules and the first metal partition-wall.

12. The device of claim 10, wherein the at least one second metal partition-wall extends in the first direction and includes a second metal partition-wall between each of the plurality of antenna modules and the first metal partition-wall.

13. The device of claim 10, wherein the first metal partition-wall encircles an outer edge of the antenna array so as to cover the at least one second metal partition-wall.

14. The device of claim 10, wherein the ground via includes a plurality of ground vias exposed in at least one face of the ground plane, wherein each of the plurality of ground vias includes a conductive material in an inner wall of a via hole defined by the plurality of dielectric substrates.

15. The device of claim 14, wherein each of the plurality of antenna modules includes a plurality of feed lines electrically connected to the RFIC chip, wherein each of the plurality of feed lines includes a plurality of conductive lines electrically connected to the ground plane and a plurality of feed vias electrically connecting the plurality of conductive lines to each other, and wherein the plurality of feed vias extend in the third direction in a meander shape.

16. The device of claim 10, wherein the first metal partition-wall is formed using a sputtering method.

17. An electronic device comprising:

a radio frequency integrated circuit (RFIC) chip; and an antenna array electrically connected to the RFIC chip, the antenna array including a first face and a second face facing each other in a first direction, and a third face and a fourth face connecting the first and second faces to each other and facing each other in a second direction intersecting the first direction, the antenna array including a plurality of substrates sequentially stacked in a third direction intersecting a plane defined by the first and second directions, first and second antenna modules on the plurality of substrates and sequentially arranged along the first direction, a first metal partition-wall extending in the second direction and including at least first metal via extending through the plurality of substrates in the third direction so as to be exposed to a ground plane, a second metal partition-wall extending in the first direction and including a second metal via extending through the plurality of substrates in the third direction so as to be exposed to the ground plane, and a third metal partition-wall surrounding the first to fourth faces, the first and second antenna modules, and the first and second metal partition-walls, and wherein the first and second metal partition-walls are arranged at a periphery of each of the first and second antenna modules but do not completely surround each of the first and second antenna modules.

18. The device of claim 17, wherein the first metal partition-wall is disposed between the first and second antenna modules.

19. The device of claim 17, wherein the third metal partition-wall encircles an outer edge of the antenna array so as to surround the first and second metal partition-walls.

20. The device of claim 17, wherein each of the first and second antenna modules includes first and second feed lines electrically connected to the RFIC chip, wherein each of the first and second feed lines includes a plurality of conductive lines electrically connected to the ground plane and a plurality of feed vias electrically connecting the plurality of conductive lines to each other, and wherein the plurality of feed vias of each of the first and second feed lines extends in the third direction in a meander shape.

* * * * *